(12) United States Patent
Roessler

(10) Patent No.: US 8,534,371 B2
(45) Date of Patent: Sep. 17, 2013

(54) ROCK PICKER AND TUMBLER

(76) Inventor: Kent Roessler, Anoka, MN (US)

( * ) Notice: Subject to any disclaimer, the term of this patent is extended or adjusted under 35 U.S.C. 154(b) by 104 days.

(21) Appl. No.: 12/855,076

(22) Filed: Aug. 12, 2010

(65) Prior Publication Data

US 2011/0036601 A1 Feb. 17, 2011

Related U.S. Application Data

(60) Provisional application No. 61/233,634, filed on Aug. 13, 2009.

(51) Int. Cl.
*A01B 43/00* (2006.01)

(52) U.S. Cl.
USPC .............................................. 171/63; 171/12

(58) Field of Classification Search
USPC ..................... 171/12, 63; 209/288
See application file for complete search history.

(56) References Cited

U.S. PATENT DOCUMENTS

| | | | | |
|---|---|---|---|---|
| 910,168 | A * | 1/1909 | Brackelsberg | 171/12 |
| 915,449 | A * | 3/1909 | Lees | 171/12 |
| 1,549,870 | A * | 8/1925 | Hamlin | 171/63 |
| 1,681,457 | A * | 8/1928 | Asplund | 171/63 |
| 1,747,645 | A * | 2/1930 | Palmer | 171/113 |
| 2,007,161 | A * | 7/1935 | Gailus | 171/7 |
| 2,533,793 | A * | 12/1950 | Hamlett | 171/12 |
| 2,725,700 | A * | 12/1955 | Fahrenholz | 171/12 |
| 2,882,976 | A * | 4/1959 | Wheeler et al. | 171/128 |
| 3,765,490 | A * | 10/1973 | Logue | 171/132 |
| 3,782,477 | A | 1/1974 | Fahrenholz | |
| 3,941,262 | A * | 3/1976 | Moser et al. | 414/722 |
| 4,167,975 | A | 9/1979 | Fahrenholz | |
| 4,282,932 | A | 8/1981 | Anderson | |
| 4,296,818 | A * | 10/1981 | Malinowski et al. | 171/63 |
| 4,315,546 | A | 2/1982 | Fahrenholz | |
| 4,345,655 | A | 8/1982 | Fahrenholz | |
| 4,609,049 | A * | 9/1986 | Migdal | 171/63 |
| 4,805,703 | A * | 2/1989 | Carlsson | 171/132 |
| 5,002,656 | A * | 3/1991 | Johansson | 209/421 |
| 5,310,008 | A | 5/1994 | Dauvin | |
| 5,311,684 | A * | 5/1994 | Van Dalfsen | 37/409 |
| 5,524,769 | A * | 6/1996 | Spencer | 209/270 |
| 5,664,348 | A | 9/1997 | Omann | |
| 5,682,953 | A | 11/1997 | Buysse | |
| 5,732,827 | A * | 3/1998 | Dorscht | 209/284 |
| 5,938,399 | A * | 8/1999 | Knutson | 414/722 |
| 6,092,606 | A | 7/2000 | Basler | |
| 6,092,607 | A * | 7/2000 | Bercheny et al. | 171/63 |
| 6,182,385 | B1 | 2/2001 | Knutson | |
| 6,360,459 | B1 * | 3/2002 | Brookhart et al. | 37/442 |
| 6,375,012 | B1 * | 4/2002 | Leyland et al. | 209/421 |
| 6,725,942 | B2 * | 4/2004 | Stevens | 172/40 |
| 7,066,275 | B1 | 6/2006 | Keigley | |
| 7,117,951 | B2 * | 10/2006 | Stevens | 171/105 |

* cited by examiner

*Primary Examiner* — Jamie L McGowan

(74) *Attorney, Agent, or Firm* — Dardi & Herbert, PLLC.; Curtis B. Herbert

(57) ABSTRACT

A front end loader attachment for picking and sorting objects, including picking rocks and sorting them from soil. An embodiment of the attachment is a device comprising a rotatable drum having a longitudinal axis, a mount for reversibly mounting the attachment to the front end loader, and a rotator assembly, with the drum comprising a base and an opposing opening defined by sidewalls connected to the base, wherein the sidewalls comprises a plurality of openings and the rotator assembly is operable to rotate the drum about the longitudinal axis.

5 Claims, 6 Drawing Sheets

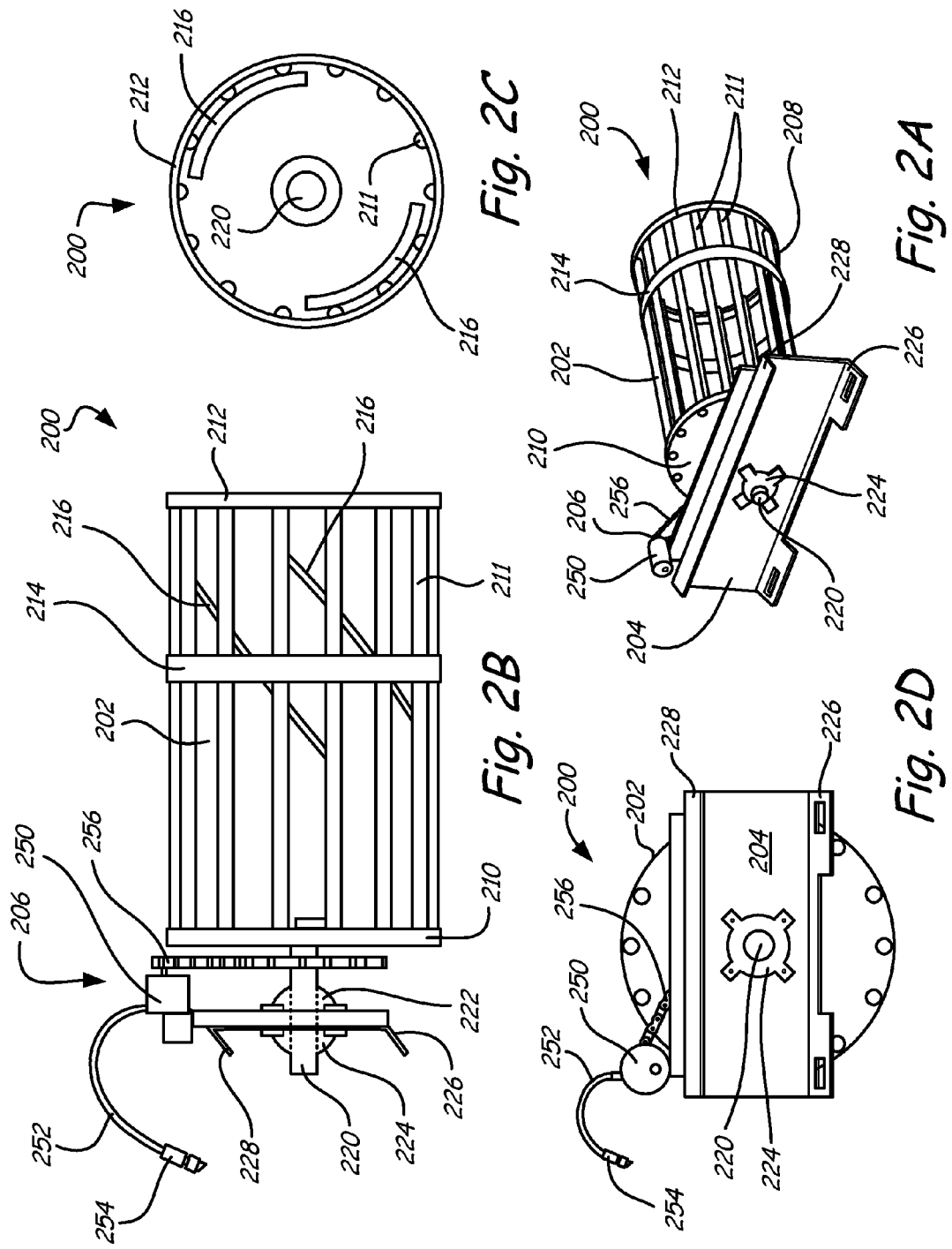

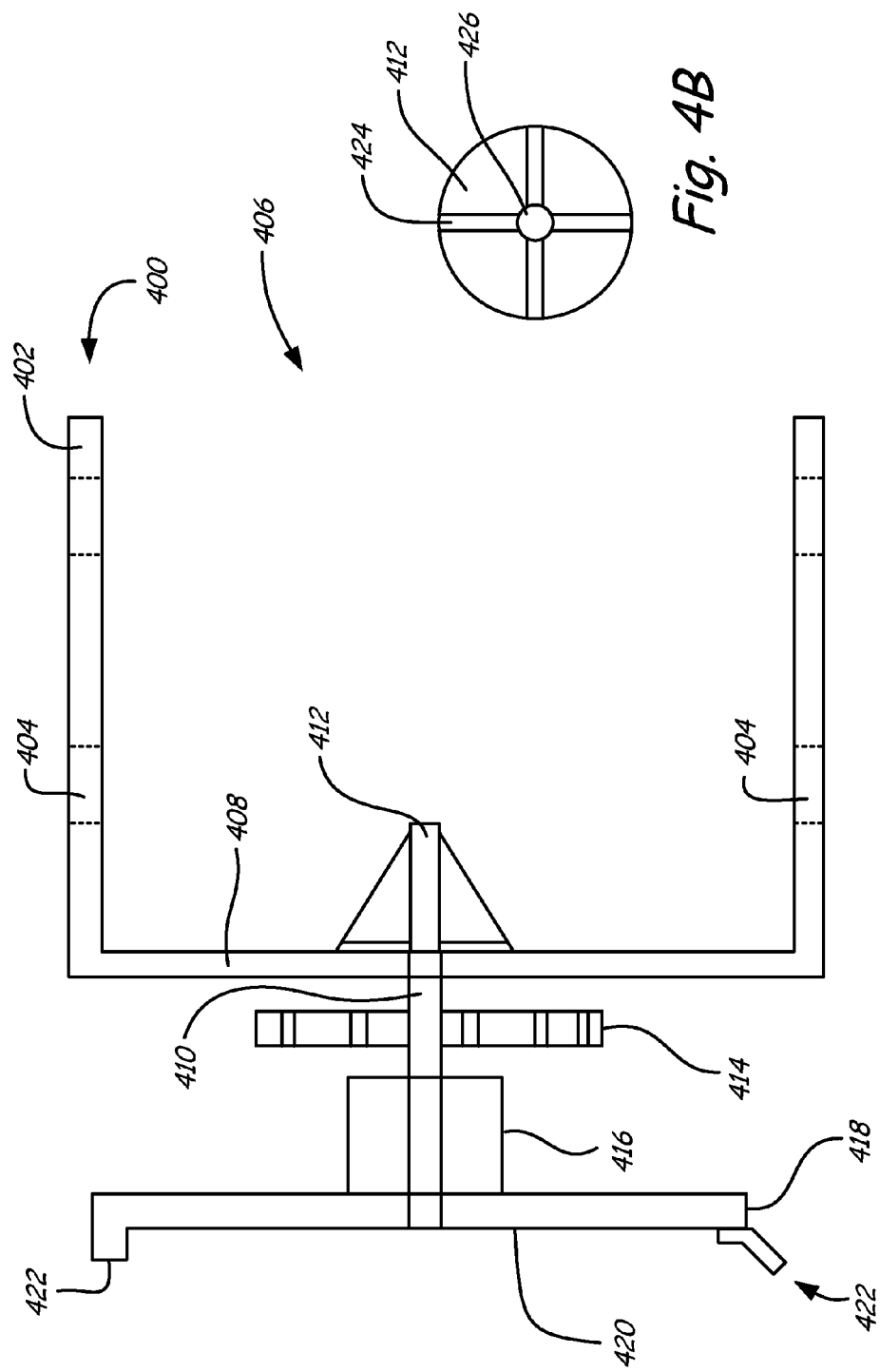

ROCK PICKER AND TUMBLER

CROSS REFERENCE TO RELATED APPLICATIONS

This application claims priority to U.S. Ser. No. 61/233,634, filed Aug. 13, 2009 which is hereby incorporated by reference herein.

TECHNICAL FIELD

The technical field relates to machines for moving and sorting rocks or other objects, including front-end loader attachments that intake and separate rocks from soil.

BACKGROUND

Farmers have long been accustomed to the need to remove rocks from a field to prepare it for sowing. Rocks are typically removed by hand and loaded into vehicles for removal. Various devices have been made to assist in this process. These include systems that involve rakes or conveyor belts, or other more complicated devices. Nonetheless, these systems are generally either not easy to use or expensive to buy and maintain.

SUMMARY OF THE INVENTION

An easy-to-use rock picker and tumbler is disclosed herein that can be provided as an attachment for a skid steer or other front-end loader that is commonly found on a farm. The attachment has a drum that can be attached to a skid steer. The drum has openings that retain the rocks but let soil fall away. A user scoops rocks into the drum and rotates the drum to separate the rocks from the soil, and then moves the drum, with the rocks, off the field. The device has been tested, is easy to use, and saves time and labor. It is applicable for collecting and moving objects besides rocks, and for purposes other than cleaning fields.

A first embodiment of the rock picker is a front end loader attachment comprising a rotatable drum having a longitudinal axis, a mount for reversibly mounting the attachment to the front end loader, and a rotator assembly, with the drum comprising a base and an opposing opening defined by sidewalls connected to the base, wherein the sidewalls comprises a plurality of openings and the rotator assembly is operable to rotate the drum about the longitudinal axis. An embodiment for using the picker and attachment is a method of removing objects from a surface, the method comprising mounting an attachment to a front end loader, wherein the attachment comprises a rotatable drum having a longitudinal axis, a base, and an opposing opening defined by sidewalls connected to the base, wherein the sidewalls comprise a plurality of openings sized to prevent passage of materials exceeding a gauge. An example of the gauge is a range of between about 1 inches and about 24 inches.

BRIEF DESCRIPTION OF THE DRAWINGS

FIG. 2A is a perspective view of an embodiment of the invention;

FIG. 2B is an elevated side view of the embodiment of FIG. 2A;

FIG. 2C is an elevated front view of the embodiment of FIG. 2A;

FIG. 2D is an elevated rear view of the embodiment of FIG. 2A;

FIG. 4A is a longitudinal cross sectional view of an alternative embodiment of the invention; and FIG. 4B is a detailed view of a flange of the embodiment of FIG. 4A.

DETAILED DESCRIPTION

An attachment for a front-end loader is described herein that provides for efficient removal of rock (or debris or other objects/material) from a surface while also separating the rock from the surrounding dirt (or other surrounding smaller material). The rock is scooped-up with any dirt into a rotating drum. The drum has passages (openings), sized to allow the dirt to fall away without allowing the rock to fall out of the drum.

Figure 1A:
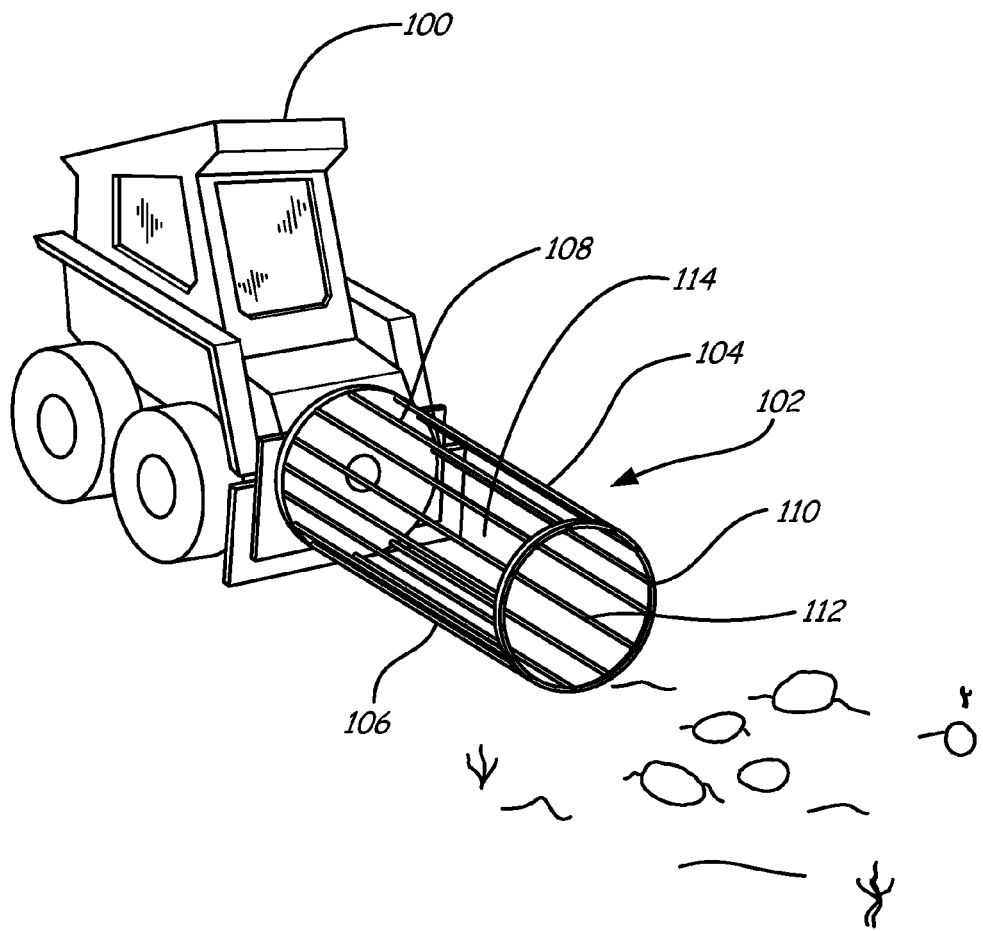
FIG. 1A is an illustration of an embodiment of the invention attached to a skid-steer.

FIG. 1A depicts a front-end loader 100 with attachment 102. Attachment 102 has drum 104 with sidewalls that are defined by a plurality of bars 106 that are attached at a proximal end to base 108 and at a distal end to rim band 110. Drum 104 has a distal opening 112 that opposes base 108.

The term drum is broad and refers to a cylindrical container. The sidewalls of the drum may be a solid and continuous metal material, as in a conventional metallic storage drum, or made of other structures that define the interior space. As depicted, a plurality of bars 106 define the sidewall. The sidewalls may be metal, steel, or other materials. There are openings 114 (passages) in the drum sidewalls. As depicted, openings 114 are the spaces between the plurality of bars. The bars are substantially parallel to each other, meaning that they do not intersect each other in the sidewall, i.e., in FIG. 1, they do not intersect between the base and the rim.

Figure 1B:
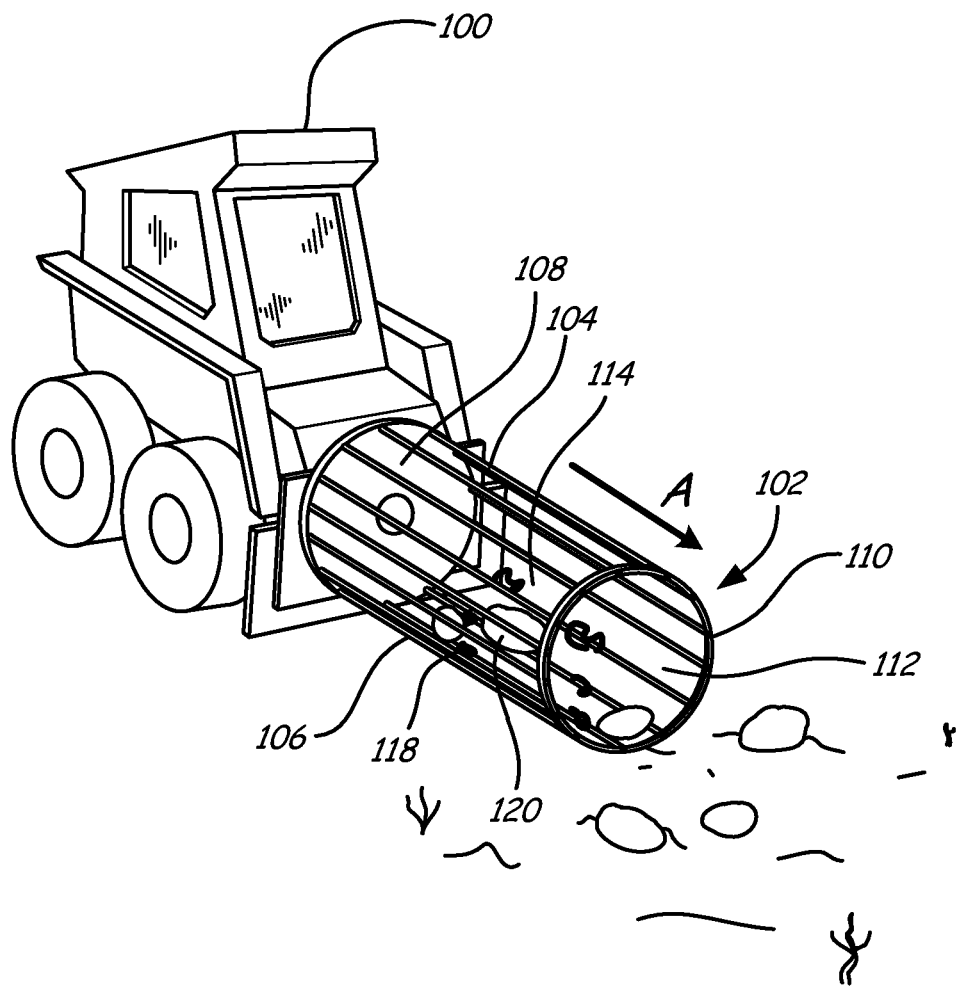
FIG. 1B is an illustration of the embodiment of FIG. 1A in use.
Figure 1C:
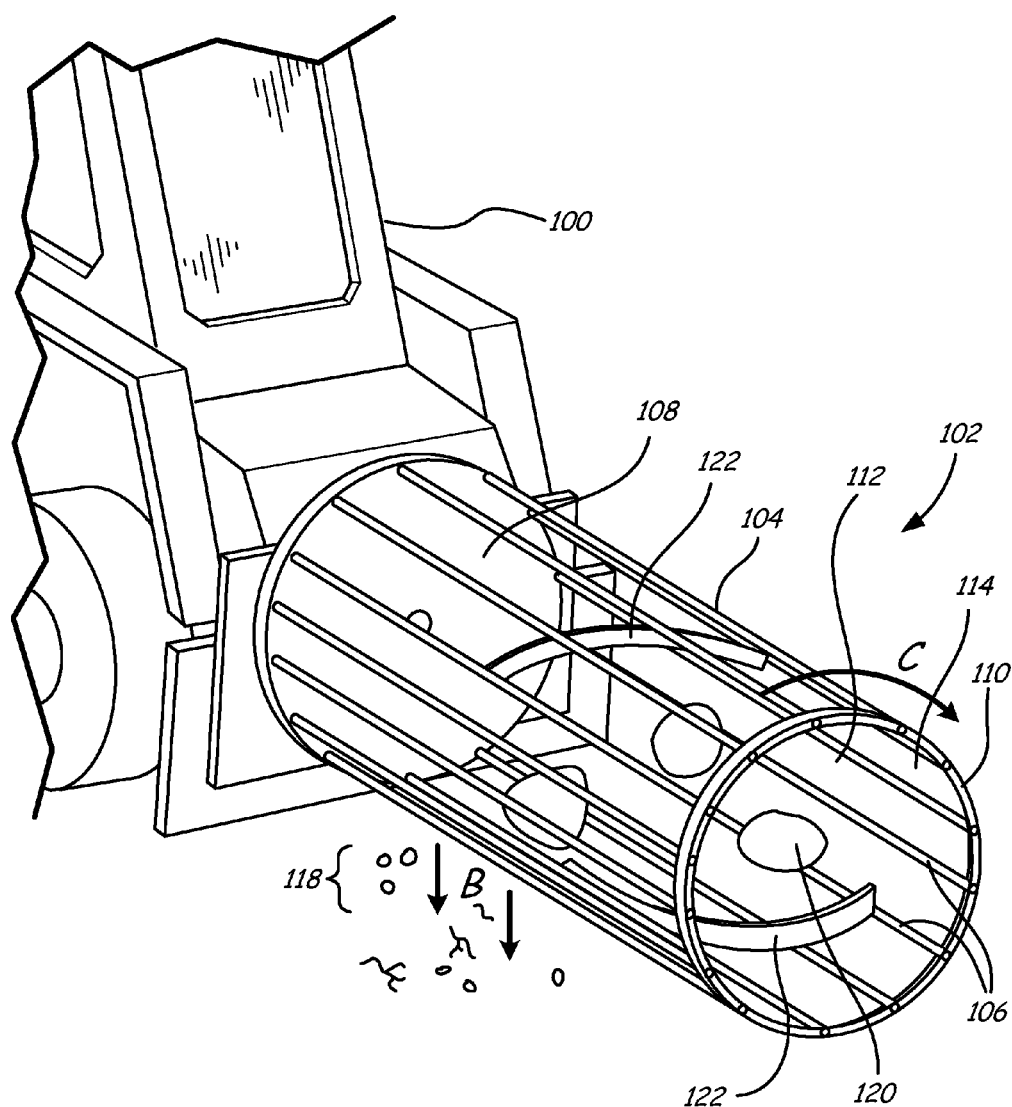
FIG. 1C is an illustration of the embodiment of FIG. 1A in use.

A user moves the front loader and drum as desired to direct rocks or other objects into the drum. FIG. 1B depicts front loader 100 moving forward (Arrow A) with drum 104 oriented towards the surface, with rim band 110 engaging it. The surface depicted is soil, and drum 104 digs into the soil, scooping up soil 118 and rocks 120. At FIG. 1C, the user elevates drum 104 to allow soil 118 to pass out of drum 104 through passages (openings 114) as at arrow B, while rocks 120 are retained. The drum is rotated, as at arrow C, to facilitate the separation. Drum 104 has flutes 122 that tend to deflect materials in drum 104 towards base 108. In some cases, the operator rotates the drum while it is in contact with the ground, to thereby help force the open end of the drum into the surface to pass under a rock or other object.

A front-loader vehicle, e.g., a skid-steer or BOBCAT, is a broad term referring to a vehicle with utility attachment on its front. Front end loaders are well known and commercially available, such as the BOBCAT of Clark Equipment Co. A conventional front end loader has a pivoting frame having an adapter mounting plate, and a working attachment, such as a scoop or bucket, attached to the plate. A hydraulic actuator moves the frame and working attachment. Front end loaders are used for a wide variety of tasks, such as digging, grading, and construction. A front loader attachment described herein is attachable to the mounting plate of the loader; many means for attaching an attachment to a front loader are known. The front loader has user-operable controls for moving the attachment up (away from a surface the loader rests upon) or down (towards the surface supporting the loader), and for adjusting the rake angle of the attachment. The rake angle, as that term is used herein, refers to the angle of an axis between the surface (meaning the surface that supports the loader) and an axis perpendicular to the attachment. In the context of FIG. 1, the rake angle is the angle between the longitudinal axis passing through the center of the drum and the surface. Accordingly, if a user is digging the rim of the opening of the drum into the ground, the drum has a negative rake angle; and if a user is cocking the drum upwardly to retain material in the drum, there is a positive rake angle.

The drum may be rotated using a rotator assembly. For instance, the drum may have a drum shaft that, when rotated, rotates the drum. A motor may be used to rotate the drum shaft. The motor may be on an attachment that also has the drum, or the motor can be on the front loader, or in another attachment that mounts to the loader or the attachment with the drum. The motor may be any suitable type, including hydraulic, gasoline, diesel, or electric. The motor and the drum shaft are operably connected, meaning that the motor can drive rotation of the drum shaft. Examples of such connections are pulley-and-belt, sprocket-to-sprocket, sprocket-and-chain. Hydraulic connections may also be used. Instead of a shaft on the drum, the drum may be turned directly by operable connection to a motor. For instance, the drum base may have a plurality of teeth that engage a chain that engages a sprocket turned by the motor. Or a pulley and belt may be used.

FIG. 2 depicts an embodiment of the rock picker and tumbler configured as an attachment 200 mountable to a skid steer or other vehicle. In use, the attachment 200 is attached to a vehicle and may be used to collect objects as already described. Attachment 200 has drum 202, mount 204, and rotator assembly 206. Drum 202 has base 210 and rim band 212 connected by sidewalls that comprise bars 211 and are reinforced by circumferential band 214. Flutes 216 are affixed to the interior of the drum. Flutes 216 are mounted transversely on the bars, at an angle of about 45 degrees relative to the base: when the drum is rotated in a clockwise manner, material that is moving from the base of the drum towards the distal opening will encounter the flute and tend to be directed back to the bottom of the drum. Shaft 220 is attached to drum 202 and passes through base 210.

Mount 204 is a plate that receives shaft 220 and supports housing 222, 224. Bearings in housing 222, 224 support shaft 220 and may be any suitable bearing or comparable device, e.g., ball bearings, ball thrust bearings, tapered roller bearings, fluid bearings, bushings, journal bearings. Mount 204 provides attachments points to a front loader, with bracket-style points being depicted at 226, 228.

Rotator assembly 206 has hydraulic motor 250 with hydraulic line 252 and hydraulic connector 254. Chain 256 operably connects a motor sprocket (not depicted) and a drum shaft sprocket (not depicted). The hydraulic line is connected to hydraulics on board the front loader. Alternatively, a hydraulic source for the motor may be provided and mounted on the attachment or on the loader. As described, other motors may be used instead of the hydraulic motor.

A shaft that is attached to the drum and passes through the mount may be perpendicular to both of them. Alternatively, the shaft may deviate from perpendicular relative to one or both of them. One embodiment provides for a drum shaft to be perpendicular to the base of the drum and enter the mounting plate at an angle that deviates from perpendicular by an amount between about 1 and about 45 degrees. The mount may accommodate this deviation so that the rake of the drum is between about 1 and about 45 degrees relative to the mounting plate: thus the drum opening points upwardly because it is tiled upwards by this deviation. Artisans will immediately appreciate that all the ranges and values within the explicitly stated ranges are contemplated, e.g., about 2 degrees and about 5 degrees, at least about 3 degrees, or from about 3 degrees to about 10 degrees. Additionally, or as an alternative, the mount may be configured to provide a rake angle when mounted on the loader so that the drum opening tends to point upwardly. The term upwardly refers to a direction away from a surface that the front loader is resting upon. One advantage of a positive rake angle is that the rocks tend to be retained in the drum without passing out of the distal drum opening when the vehicle is moving.

Openings in the drum sidewalls may be sized to retain objects of predetermined dimensions. For instance, the sidewall openings may be sized so that the openings prevent passage of materials exceeding a gauge. The term gauge refers to the diameter of a circular opening. If an object can not be passed through the circular opening, then it exceeds the gauge. Examples include a gauge between about 0.5 inches and about 24 inches; artisans will immediately appreciate that all the ranges and values within the explicitly stated ranges are contemplated, e.g., from about 1 inch to about 12 inches, or from about 2 inches to about 6 inches.

Figure 3A:
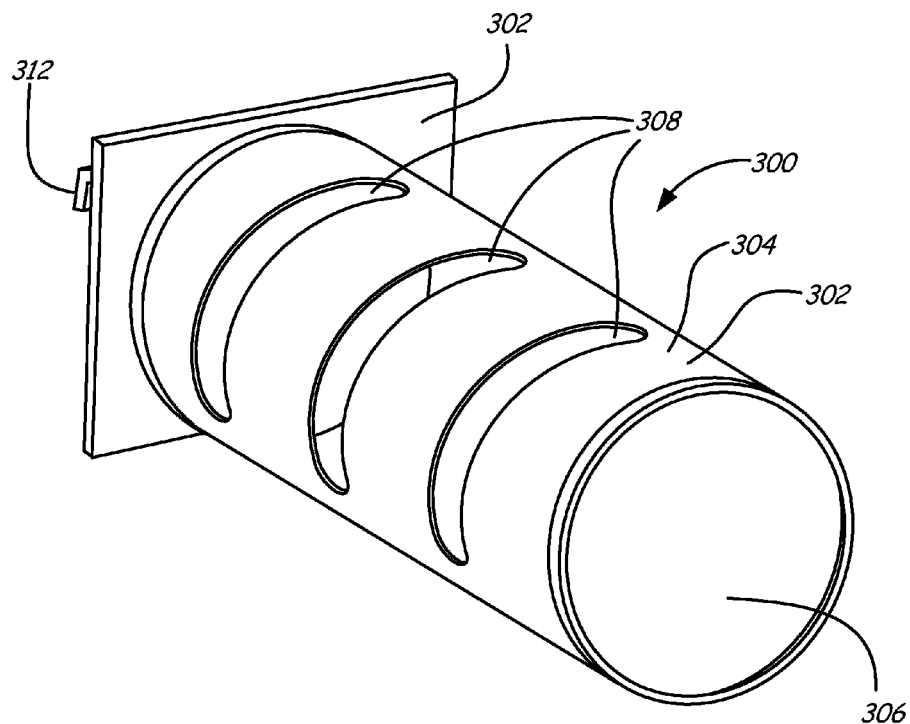
FIG. 3A is a perspective view of an alternative embodiment of the invention.
Figure 3B:
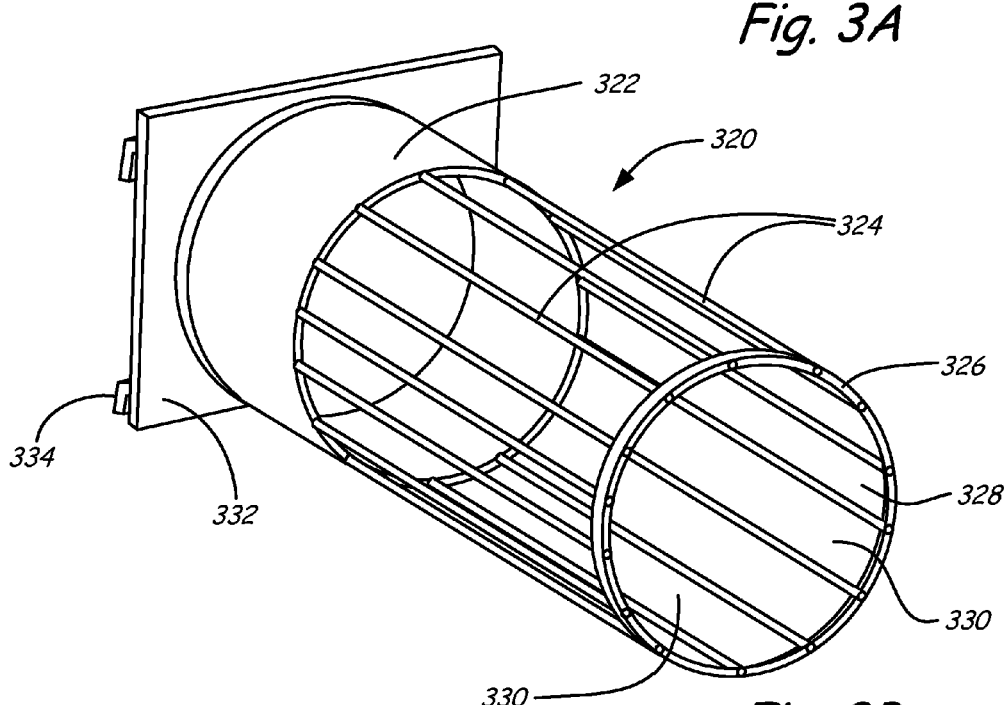
FIG. 3B is a perspective view of an alternative embodiment of the invention.

The sidewalls may have various configurations, as may the openings in the sidewalls. The drum may be made with a plurality of bars (a term including bars with cross sections that are, e.g., circular, oval, square, or polygonal), with the spacing between the bars adjusted as desired to achieve a gauge. The drum is generally cylindrical, a term that includes other shapes, e.g., polygonal, elliptical. While bars are described herein as an embodiment, the drum may alternatively be substantially solid, with one or more passages created by slots or other openings in the drum. FIG. 3A depicts an alternative drum embodiment. Attachment 300 has drum 302 with sidewalls 304 that define distal opening 306 that opposes the drum base (not shown). Openings 308 allow passage of materials from the drum interior to the outside of the drum. Drum 302 is rotatably mounted on mount 310 that has attachment points 312. FIG. 3B depicts alternative drum embodiment 320 with sidewalls 322 that comprise bars 324 that are joined to drum rim 326 that defines distal drum opening 328. Openings 330 between bars 324 allow passage of some but not all materials captured into the drum. Drum 320 is rotatably mounted to base 332 that has attachment points 334.

FIG. 4 is a cross-sectional view that depicts an alternative rock picker embodiment, wherein the drum shaft is mounted flush with the mount plate and a bushing is used for thrust bearings. Drum 400 has sidewalls 402 with openings 404. The sidewalls define distal opening 406 at their distal ends opposing base 408. Shaft 410 passes through base 408 and is received by flange 412 that is fixed to the drum and transmits shaft 410 rotation to drum 400. A motor (not shown) is operably connected to turn sprocket 414 that is on shaft 410. Housing 416 on mount plate 418 houses thrust bearings that support shaft 410. Shaft 410 does not pass through mount plate 418, or passes through plate 418 and terminates so that it is flush with proximal side 420 of mount plate 418. Mount plate 418 has attachment points 422. FIG. 4B depicts flange 412 with ribs 424 and cap 426 that covers shaft 410.

Another alternative is to affix a sprocket or other drive to the drum and turn the drum while allowing the shaft to remain still. In the case of FIG. 4, for instance, the sprocket could be moved into the drum and the flange assembly further equipped with bearings and bearing surfaces to allow rotation of the drum around the shaft.

An embodiment of a rock picker comprises a rotatable drum attached to a mount, e.g., a quick latch bracket for a skid steer. A plurality of bars substantially form the drum. Reinforcing bands connect the bars to each other. The drum base is, e.g., a one-inch thick steel cap. The drum includes a reinforcing rim around the distal end of the drum that defines the distal drum opening; the rim may engage the ground or other surface in use. A steel band may be used to provide strength for the drum at the rim or elsewhere on the drum, e.g., a steel band of 1 or 1.5 inch thickness. The drum includes optional flutes having a leading edge and a trailing edge offset relative to the bars to push the rocks to the bottom of the drum when it rotates. The drum may have a shaft that passes through the base. The shaft may be turned by a sprocket that is in turn moved by a chain that is driven by a sprocket rotated by a motor, e.g., a hydraulic motor. By way of example, the shaft is about 12 inches long and about three inches in diameter, and passes through the mount plate and the bottom of the drum, with bearing surfaces at or near the mount plate.

The rim of the drum may comprise a bevel to ease urging of objects into the drum. The drum may comprise serrations, prongs, or rakes, e.g., at the distal portion of the drum and extending therefrom.

An embodiment of the invention is an attachment for gathering stone from a surface adaptable for use with a front end loader-type vehicle, comprising: a plurality of parallel bars attached to a bottom plate that together define an open-ended drum, and a mount for mounting said attachment to a front end loader with the bottom proximate the loader and the open end distal thereto, wherein the drum, after being attached, is rotatable with the plurality of bars being substantially parallel to a surface that the front-end loader-type vehicle rests upon. Alternatively, the drum has an open end and a plurality of openings sized for passage of dirt, e.g., at least about 0.5 cm wide.

The following patent applications are hereby incorporated by reference herein for all purposes, and for purposes of incorporating features therein with embodiments and features set forth herein; in case of conflict, the present specification controls: U.S. Pat. Nos. 3,782,477, 4,315,546, 4,282,932, 4,167,975, 7,066,275, 6,182,385, 6,092,606, 5,682,953, 5,664,348, and 5,310,008.

The invention claimed is:

1. A front end loader rock picker attachment attachable to a front end loader that operates on a surface, the rock picker attachment consisting essentially of a mount for mounting the rock picker attachment to the front end loader, a rotator assembly, and a rotatable drum, said drum having a longitudinal axis and consisting essentially of a base, a plurality of parallel bars, and an opposing circular opening defined by a rim band around the circular opening, the rim band being connected to the base with the plurality of substantially parallel bars, said bars being parallel to the longitudinal axis, with gaps between the bars defining a plurality of openings, with the rotator assembly being operable to rotate the drum about the longitudinal axis, wherein the drum is movable to engage the surface with the rim band.

2. The attachment of claim 1 wherein the rotator assembly has a motor chosen from the group consisting of hydraulic, gasoline, diesel, and electric.

3. The attachment of claim 1 wherein the rotator assembly and the drum are operably connected by a mechanism chosen from the group consisting of pulley-and-belt, sprocket-to-sprocket, sprocket-and-chain, and hydraulic connections.

4. A method of removing rocks from a surface, the method comprising:

mounting a rock picker attachment to a front end loader,
the rock picker attachment consisting essentially of a mount for mounting the attachment to the front end loader, a rotator assembly and a rotatable drum, said drum having a longitudinal axis and consisting essentially of a base, a plurality of parallel bars, and an opposing round opening defined by a rim band around the round opening, the rim band being connected to the base with a plurality of substantially parallel bars parallel to the longitudinal axis with gaps between the bars defining a plurality of openings sized to prevent passage of rocks exceeding a gauge while passing materials that are less than the gauge wherein the drum is movable to engage the surface, said rotator assembly being operable to rotate the drum about the longitudinal axis, maneuvering the front end loader and drum to contact the surface with the rim band of the drum and thereby direct the rocks into the drum lifting the drum and rotating the drum to retain the rocks while allowing materials smaller than the gauge to pass out of the plurality of openings to thereby separate the rocks from the materials.

5. The method of claim 4 wherein the materials comprise soil.

* * * * *